US012614714B2

(12) United States Patent
Hwang et al.

(10) Patent No.: US 12,614,714 B2
(45) Date of Patent: Apr. 28, 2026

(54) EQUIPMENT FOR CONTINUOUSLY PROCESSING ELECTROCHEMICAL DEVICE OR COMPONENT FOR INCREASING CAPACITY

(71) Applicants: National Taiwan University of Science and Technology, Taipei (TW); Forschungszentrum Jülich GmbH, Jülich (DE)

(72) Inventors: Bing-Joe Hwang, Taipei (TW); Wei-Nien Su, Taipei (TW); Sheng-Chiang Yang, Taipei (TW); Tsai-Pin Wu, Taipei (TW); Chen-Jui Huang, Taipei (TW); Winter Martin, Münster (DE); Gunther Brunklaus, Münster (DE)

(73) Assignees: National Taiwan University of Science and Technology, Taipei (TW); Forschungszentrum Jülich GmbH, Jülich (DE)

( * ) Notice: Subject to any disclaimer, the term of this patent is extended or adjusted under 35 U.S.C. 154(b) by 453 days.

(21) Appl. No.: 17/734,204

(22) Filed: May 2, 2022

(65) Prior Publication Data

US 2023/0327070 A1 Oct. 12, 2023

(30) Foreign Application Priority Data

Mar. 28, 2022 (TW) .................................. 111111542

(51) Int. Cl.
  H01M 4/04 (2006.01)
  C25D 21/04 (2006.01)
  (Continued)

(52) U.S. Cl.
  CPC .......... H01M 4/0452 (2013.01); C25D 21/04 (2013.01); H01M 4/0459 (2013.01); H01M 4/139 (2013.01); H01M 10/058 (2013.01)

(58) Field of Classification Search
  CPC .. H01M 4/139; H01M 4/0452; H01M 4/0459; H01M 10/058; C25D 21/04
  See application file for complete search history.

(56) References Cited

U.S. PATENT DOCUMENTS

| | | | | |
|---|---|---|---|---|
| 4,132,609 A | * | 1/1979 | Bush ...................... | C25D 7/065 204/206 |
| 2013/0302697 A1 | * | 11/2013 | Wang .................... | H01M 4/485 977/749 |

(Continued)

FOREIGN PATENT DOCUMENTS

| | | |
|---|---|---|
| EP | 0346981 A1 | 12/1989 |
| JP | 2013194288 A | 9/2013 |
| WO | 2022046327 A1 | 3/2022 |

OTHER PUBLICATIONS

Michel Armand, et al., "Sacrificial salts: Compensating the initial charge irreversibility in lithium batteries", Electrochemistry Communications, 2010, 12, 1344-1347 (Year: 2010).*

(Continued)

*Primary Examiner* — James Lin
*Assistant Examiner* — Kevin Sylvester
(74) *Attorney, Agent, or Firm* — Best & Flanagan LLP

(57) ABSTRACT

Equipment for continuously processing electrochemical devices or components for increasing capacity comprises a first reaction part, a second reaction part and a separated layer in between. The first reaction part comprises a counter electrode and a first reaction solution contained in a first reaction cell having a gas outlet. The first reaction solution will produce a first non-metallic ion, a second metallic ion and a gas after an electrochemical reaction. The second (Continued)

reaction part comprises a working electrode and a second reaction solution containing the second metallic ion permeated through the separated layer from the first reaction part. The second metallic ion will then be deposited as metal particles onto the working electrode which has been continuously fed into the second reaction part. The equipment can continuously produce electrodes with additional lithium source without a gas byproduct and with even distribution and high quality.

9 Claims, 4 Drawing Sheets

(51) Int. Cl.
    *H01M 4/139*        (2010.01)
    *H01M 10/058*     (2010.01)

(56)          References Cited

U.S. PATENT DOCUMENTS

| | | | |
|---|---|---|---|
| 2015/0041327 A1 | 2/2015 | Buckalew et al. | |
| 2016/0351889 A1 | 12/2016 | Swonger et al. | |
| 2019/0051885 A1* | 2/2019 | Swonger | C25D 3/42 |
| 2019/0226109 A1* | 7/2019 | Park | H01M 4/04 |
| 2019/0379021 A1* | 12/2019 | He | H01M 4/623 |
| 2020/0358082 A1* | 11/2020 | Wang | H01M 4/134 |
| 2021/0050597 A1* | 2/2021 | Lin | H01M 10/0525 |
| 2022/0123276 A1* | 4/2022 | Hwang | H01M 10/058 |

OTHER PUBLICATIONS

Tony Jaumann, et al., "Role of 1,3-Dioxolane and LiNO3 Addition on the Long Term Stability of Nanostructured Silicon/Carbon Anodes for Rechargeable Lithium Batteries", Journal of The Electrochemical Society, 2016, 163 (3), A557-A564. (Year: 2016).*

Sophie Solchenbach, et al., "Lithium Oxalate as Capacity and Cycle-Life Enhancer in LNMO/Graphite and LNMO/SiG Full Cells", Journal of The Electrochemical Society, 2018, 165 (3) A512-A524. (Year: 2018).*

Zhibin Zhou, et al., "Highly salt-concentrated electrolyte comprising lithium bis(fluorosulfonyl)imide and 1,3-dioxolane-based ether solvents for 4-V-class rechargeable lithium metal cell", Electrochimica Acta, 2020, 363, 137198 (Year: 2020).*

Leung et al. ("Review—Progress in Electrolytes for Rechargeable Aluminum Batteries," J. Electrochem. Soc. 2021, 168, article 056509). (Year: 2021).*

Olbasa et al. ("High-Rate and Long-Cycle Stability with a Dendrite-Free Zinc Anode in an Aqueous Zn-Ion Battery Using Concentrated Electrolytes," ACS Appl. Energy Mater. 2020, 3, 4499-4508). (Year: 2020).*

* cited by examiner

10

114
124     125
113     123
121
111   112     13     122
11     12

EQUIPMENT FOR CONTINUOUSLY PROCESSING ELECTROCHEMICAL DEVICE OR COMPONENT FOR INCREASING CAPACITY

FIELD OF INVENTION

The Present invention is related to equipment for processing a battery component, especially to electrode of a battery being continuously processed by the equipment to have a higher capacity.

The present invention has been developed primarily to produce an electrode of a lithium metal battery for describing hereinafter with references and multiple embodiments to this application. However, it will be appreciated that the present invention is not limited to this particular type of battery with certain metal deposits. Other electrochemical batteries with suitable metal sources could also be applied to this invention.

BACKGROUND OF THE INVENTION

A concept of conventional prelithium technology is generally referred to put additional lithium sources into the battery in advance to increase the battery's capacity and prolong the life cycle. The most common way to put an additional lithium source in the prelithium technology is to mix lithium particles directly in the electrode slurry or in the electrolyte, and packaging the battery with the electrode with an additional lithium source.

However, this mixing method is considered to a mechanical method which is easy to cause uneven disperse of mixed lithium source particles with accompanying side reactions or byproducts of gases or bubbles accumulated in the battery. These side reactions or byproducts of gases or bubbles will cause the quality problem or even electrochemical decline to the battery.

Hence, it is eager to have a solution that will overcome or substantially ameliorate at least one or more of the deficiencies of a prior art, or to at least provide an alternative solution to the problems. It is to be understood that, if any prior art information is referred to herein, such reference does not constitute an admission that the information forms part of the common general knowledge in the art.

SUMMARY OF THE INVENTION

In order to solve the problems causing by the conventional mechanically mixing method with uneven disperse of the additional lithium source and also the gases or bubbles accumulated inside the battery causing decreasing the capacity or life cycles. The present invention provides equipment for continuously processing electrochemical device or component for increasing capacity comprises: a first reaction part, a second reaction part, and a separated layer configured to be placed between the first reaction part and the second reaction part, wherein:

the first reaction part is selectively permeable with certain ions from the second reaction part through the separated layer;

the first reaction part comprises a counter electrode, a first reaction cell, a first reaction solution contained in the first reaction cell, and the counter electrode is immersed into the first reaction solution in the first reaction cell of the first reaction part;

a gas outlet is configured to be on the first reaction cell of the first reaction part;

the first reaction solution contains a first non-metallic ion, a second metallic ion, and a third gas, and the third gas is discharged from the gas outlet;

the second reaction part comprises a working electrode, a second reaction cell, and a second reaction solution contained in the second reaction cell; and the second metallic ion passes through the separated layer from the first reaction cell to the second reaction cell and reducing as a metal deposit onto the working electrode.

According to the above description, the present invention provides equipment that can continuously process and deposit additional lithium source or any suitable metal source on an electrode of a battery for increasing its capacity. The present invention not only improves the conventional mixing method resulting in poor or uneven disperse but also solves the problem of byproducts like gases or bubbles affecting the quality of the battery during the operation. These gases or bubbles are designed to be discharged during the process without entering packaged battery to affect the deposition of the lithium/metals source or the quality of battery products. Furthermore, the quantity of deposited metal source on the electrode is adjustable by the present invention by reacting with different concentrations of the reaction electrolyte. To provide a continuing process, the input electrode film could be continuously input and deposited with additional lithium or metal source by keep adding fresh reaction electrolyte to the equipment of the present invention. Many of the attendant features and advantages of the present invention will become better understood with reference to the following detailed description considered in connection with the accompanying figures and drawings.

BRIEF DESCRIPTION OF THE DRAWINGS

The steps and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
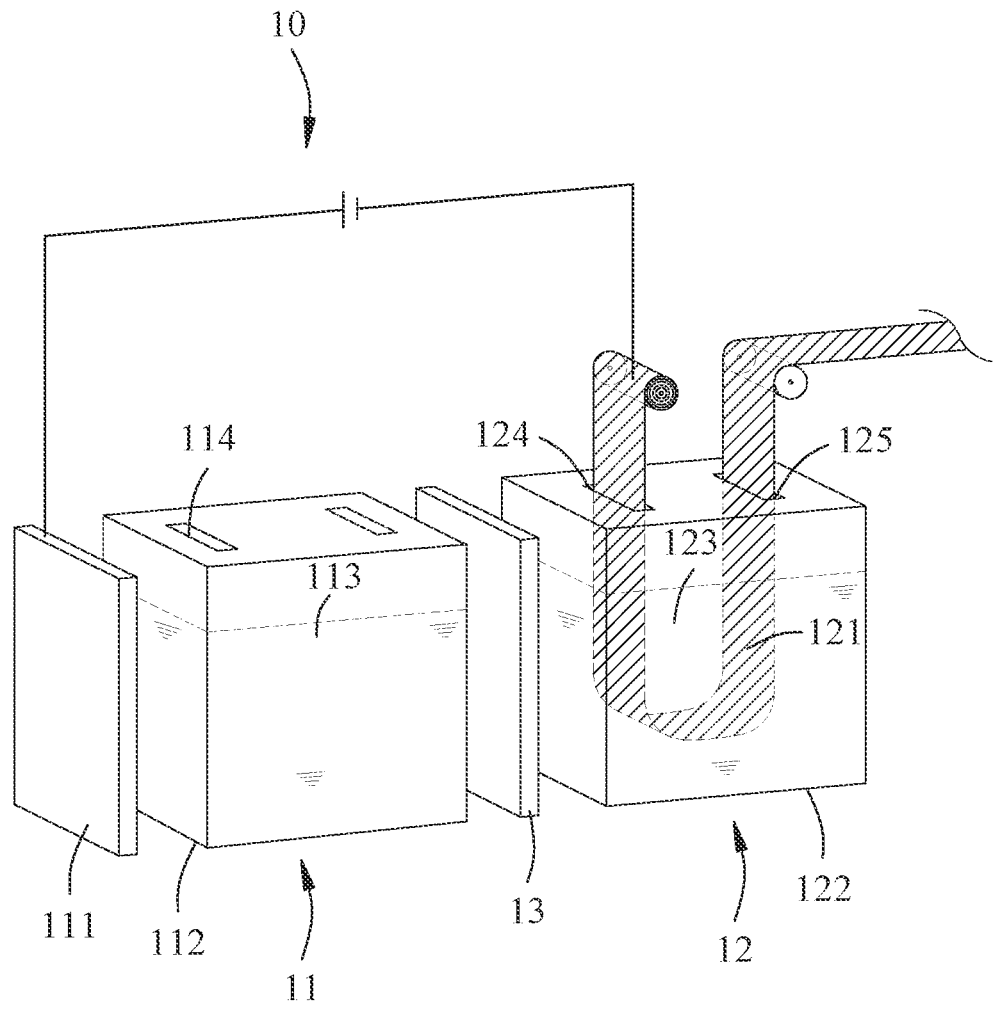
FIG. 1 is an illustration of a preferred embodiment of equipment for continuously producing electrochemical devices with increased capacity in accordance with the present invention.

Reference will now be made in detail to the presently preferred embodiments of the invention, examples of which are illustrated in the accompanying drawings. Wherever possible, the same reference numbers are used in the drawings and the description to refer to the same or like parts. It is not intended to limit the method by the exemplary embodiments described herein. In the following detailed description, for purposes of explanation, numerous specific details are set forth in order to attain a thorough understanding of the disclosed embodiments. It will be apparent, however, that one or more embodiments may be practiced without these specific details. As used in the description herein and throughout the claims that follow, the meaning of "a", "an", and "the" may include reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to.

Embodiment 1 of the Equipment for Continuously Processing Electrochemical Device or Component for Increasing Capacity With reference to FIG. 1, the present invention provides equipment 10 for continuously processing electrochemical device or component for increasing capacity comprises a first reaction part 11, a second reaction part 12 and a separated layer 13 configured to be placed between the first reaction part 11 and the second reaction part 12. The first reaction part 11 is liquid permeable but selective permeable with certain ions from the second reaction part 12 through the separated layer 13.

The first reaction part 11 comprises a counter electrode 111, a first reaction cell 112, and a first reaction solution 113 contained in the first reaction cell 112. The counter electrode 111 is preferred to be immersed into the first reaction solution 113 in the first reaction cell 112 of the first reaction part 11. A preferred example of the counter electrode 111 may be but not limited to a platinum electrode. A gas outlet 114 is configured to be on a top of the first reaction cell 112 of the first reaction part 11. The gas outlet 114 could also be a material inlet for adding fresh reaction material. The material inlet is not limited to be also another inlet configured to the top of the first reaction cell 112 for adding the said fresh reaction material in the present invention.

The second reaction part 12 comprises a working electrode 121, a second reaction cell 122, and a second reaction solution 123 contained in the second reaction cell 122. A feeding inlet and an output outlet 125 are configured to be at a top of the second reaction cell 122. The working electrode 121 of the present invention is preferred to be a film or a sheet continuously feeding into the feeding inlet 124, immersing into the second reaction solution 123 and further outputting from the output outlet 125. The working electrode 121 of the present invention may be but not limited to any electrode which could deposit suitable metal thereon, i.e. lithium electrode.

Figure 2:
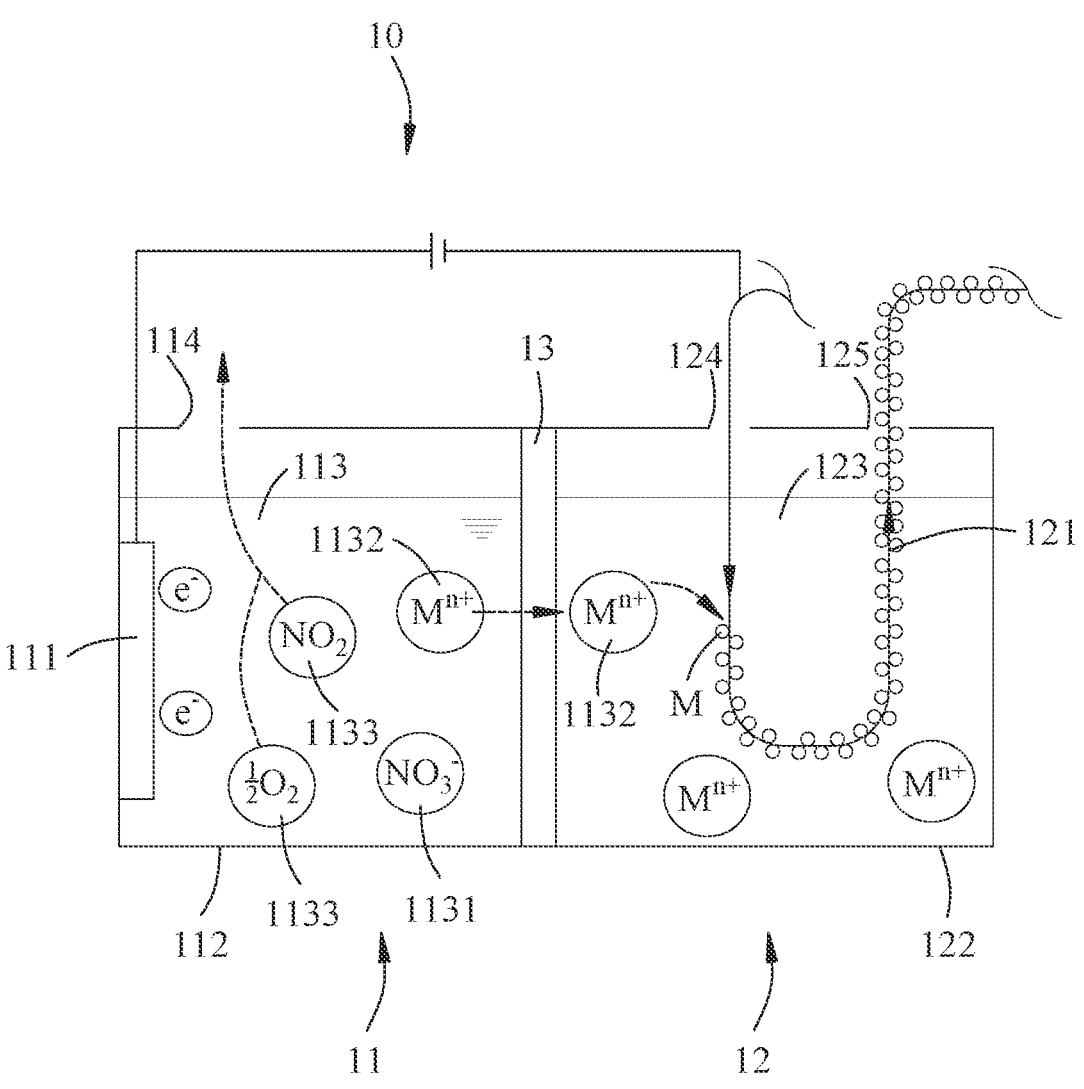
FIG. 2 is another illustration of a preferred embodiment of equipment for continuously producing electrochemical devices with increased capacity in accordance with the present invention.

With reference to FIG. 2, the first reaction solution 113 contains a first non-metallic ion 1131, a second metallic ion 1132, and a third gas 1133. The second reaction solution 123 contains the second metallic ion 1132 came from the first reaction solution 113 through the separated layer 13 and a metal deposit M reduced from the second metallic ion 1132. The metal deposit M is deposited on the surface of the working electrode 121.

Embodiment of the Processing Method by Using The Equipment of the Present Invention With reference to FIGS. 1 and 2, a continuous processing method is provided by using the abovementioned equipment.

Table 1 below lists a preferred actuation of the equipment before and after the electrochemical reaction of the present invention and the raw material reacted in the first reaction solution 113 and the second reaction solution 123 and the product or by-product (Byproduct) produced after the reaction.

Table 1

| | Reaction Solution | | |
|---|---|---|---|
| Material/ | The first reaction solution | | The second reaction solution |
| Components | Embodiment 1 | Embodiment 2 | Embodiment 1 |
| Reaction electrolyte | Lithium/ Magnesium/ Zinc/Aluminum/ Sodium compound (ie, 1M of Lithium bis(trifluoro-methanesulfonyl) imide (LiTFSi)) | Lithium/ Magnesium/ Zinc/Aluminum/ Sodium compound (ie, 2 wt % of Lithium oxalate, 1M of Lithium bis(trifluoro-methanesulfonyl) imide (LiTFSi)) | Lithium/Magnesium/ Zinc/Aluminum/ Sodium compound (ie, 2 wt % of lithium nitrate (LiNO$_3$), 1M of Lithium hexafluorophosphate (LiPF$_6$)) |
| Reaction solvent | Methoxymethane (DME) or 1,3-dioxolane (DOL) | Methoxymethane (DME) or 1,3-dioxolane (DOL) | Ethylene carbonate (EC) or Diethyl carbonate (DEC) |
| Product: The first non-metallic ion 1131 | Nitrate ion (NO$_3^-$) | Oxalate ion (C$_2$O$_4^{2-}$) | N/A (The second reaction solution doesn't contain the first non-metallic ion 1131) |
| Product: The second metallic ion 1132 | Lithium ion (Li$^+$), Magnesium ion (Mg$^{2+}$), Zinc ion (Zn$^{2+}$), Aluminum ion (Al$^{3+}$) or Sodium ion (Na$^+$) | Lithium ion (Li$^+$), Magnesium ion (Mg$^{2+}$), Zinc ion (Zn$^{2+}$), Aluminum ion (Al$^{3+}$) or Sodium ion (Na$^+$) | Lithium ion (Li$^+$), Magnesium ion (Mg$^{2+}$), Zinc ion (Zn$^{2+}$), Aluminum ion (Al$^{3+}$) or Sodium ion (Na$^+$) (From the first reaction solution through the separated layer 13) |
| Byproduct: The third gas 1133 | Nitrogen dioxide (NO$_2$), Nitric oxide (NO) or | Carbon dioxide (CO$_2$) or Carbon monoxide (CO) | N/A (The second reaction cell doesn't generate gas nor permeate gas from the first |

-continued

| Reaction Solution | | | |
| --- | --- | --- | --- |
| Material/ | The first reaction solution | | The second reaction solution |
| Components | Embodiment 1 | Embodiment 2 | Embodiment 1 |
| Product: Metal deposits M | Oxygen ($O_2$) N/A (The first reaction cell doesn't generate metal deposits) | N/A (The first reaction cell doesn't generate metal deposits) | reaction cell) Lithium metal deposit (Li), Magnesium metal deposit (Mg), Zinc metal deposit (Zn), Aluminum metal deposit or Sodium metal deposit (Na) |

As the working electrode 121 continuously feeding into the second reaction cell 122 from the feeding inlet 124 and immersing into the second reaction solution 123 and outputting from the output outlet 125, an electrochemical reaction will be taken place in both the first and the second reaction solution 113 and eventually having the metal deposits M deposited onto the working electrode 121 evenly without any interference from the gases or bubbles from the byproducts which these gases or bubbles unable to permeate through the separated layer 13 and have already discharged from the gas outlet at the first reaction cell 112. The suitable working electrode 121 of the present invention comprises but is not limited to a positive electrode or a negative electrode in a form of line, ribbon, strip, sheet, columnar or tubular, etc.

Taking an example from the first embodiment of the first and the second reaction solution 113, 123, when operating the equipment of the present invention, the electrochemical reaction performed in the first reaction cell 112 of the first reaction part 11 comprises the following formula (1) and formula (2):

$$LiNO_3 \rightarrow Li^+ + NO_3^- \qquad \text{formula (1)}$$

$$NO_3^- - E \rightarrow NO_2 + \tfrac{1}{2}O_2 \qquad \text{formula (2)}$$

By providing lithium compound (2 wt % $LiNO_3$) as the reaction electrolyte in the first reaction cell 112 with 1M LiTFSi and DME/DOL as the solvent for conducting electrochemical reaction, the first non-metallic ion 1131 will be generated as a nitrate ion ($NO_3^-$), nitric oxide (NO), nitrogen dioxide ($NO_2$) and oxygen ($O_2$) generated as the third gas 1133 and at the same time the second metallic ion 1132 is lithium ion.

The separated layer 12 is preferred to be selectively permeable for the second metallic ion 1132 (which is lithium ion from the first embodiment) so as to allow only the second metallic ion 1132 travel from the first reaction part 11 through the second reaction part 12. The third gas 1133 will stay in the first reaction part 11 and to be discharged from the gas outlet 114 without affecting or making any interference for the metal deposits M being successfully deposited on the working electrode 121 in the second reaction part 12. When the second metallic ion 1132 of the first reaction part 11 is consumed, the fresh reaction electrolytes and/or reaction solvent (if necessary) can be directly added to continue the new reactions for maintaining continuous process to the working electrode 121. As such, the quantity of metal deposits on the working electrode 121 could be adjustable by the present invention by adding different concentrations of the reaction electrolyte.

Further, the second reaction cell 122 of the second reaction part 12 performs the electrochemical reaction as following formula (3):

$$Li^+ + e^- \rightarrow Li_{(m)} \qquad \text{formula (3)}$$

The second metallic ion 1132 (ie, lithium ion) from the first reaction cell 112 travels through the separated layer 12 to the second reaction cell 122 and is reduced into metal deposit M (ie, lithium metal) and deposited on the surface of the working electrode 121. By continuously feeding the working electrode 121 from the feeding inlet 124 into the second reaction cell 122, the metal deposit M will continuously deposit onto the surface of the working electrode 121 and to be output from the output outlet 125 to achieve continuous processing.

The equipment is designed to have the third gas 1133 directly discharged in the first reaction cell 112. The separated layer 13 is preferred to be a selectively permeable membrane or film (e.g., according to the size of the ions to be selectively permeated) which allows only the second metallic ion 1132 to be permeated or passed through to the second reaction cell 122 to prevent any gas or bubbles that may interfere with the lithium metal deposited in the working electrode 121 in the second reaction cell 122 and to achieve a high-quality and evenly lithium metal deposited condition on the working electrode 121.

The processed working electrode 121 as being output from the output outlet 125 of the present invention could be further transported to the subsequent battery assembly or packaging process. As shown in FIG. 1, the equipment of the present invention may be designed as a roll-to-roll production equipment for continuously processing the electrodes with additional lithium source deposits as to be connected with the conventional battery production process <Validation Tests>

Figure 3A:
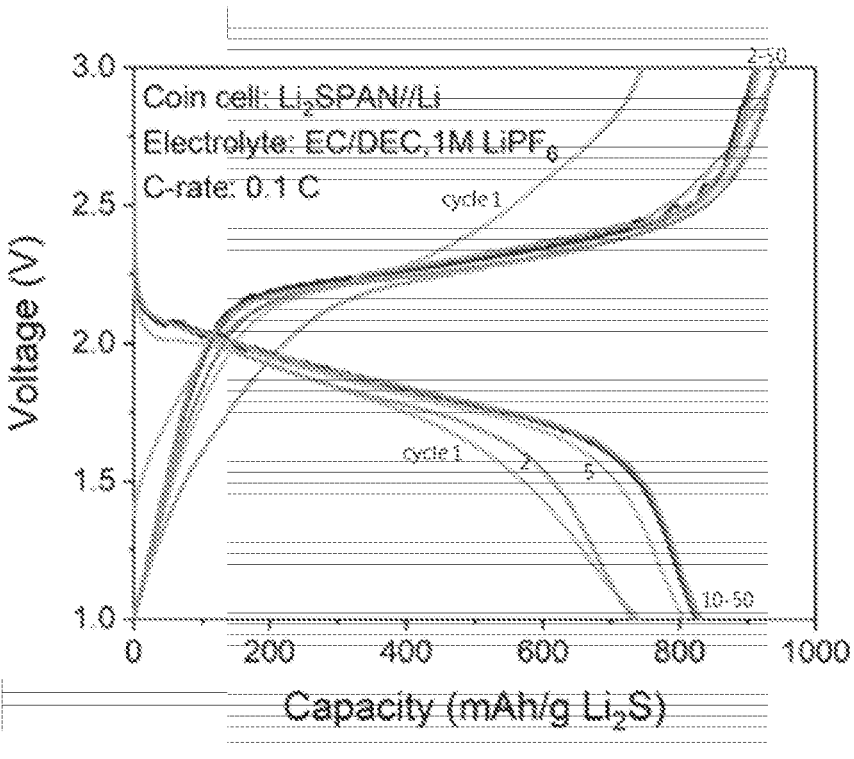
FIGS. 3A and 3B are validation tests for the preferred embodiments in accordance with the present invention.
Figure 3B:
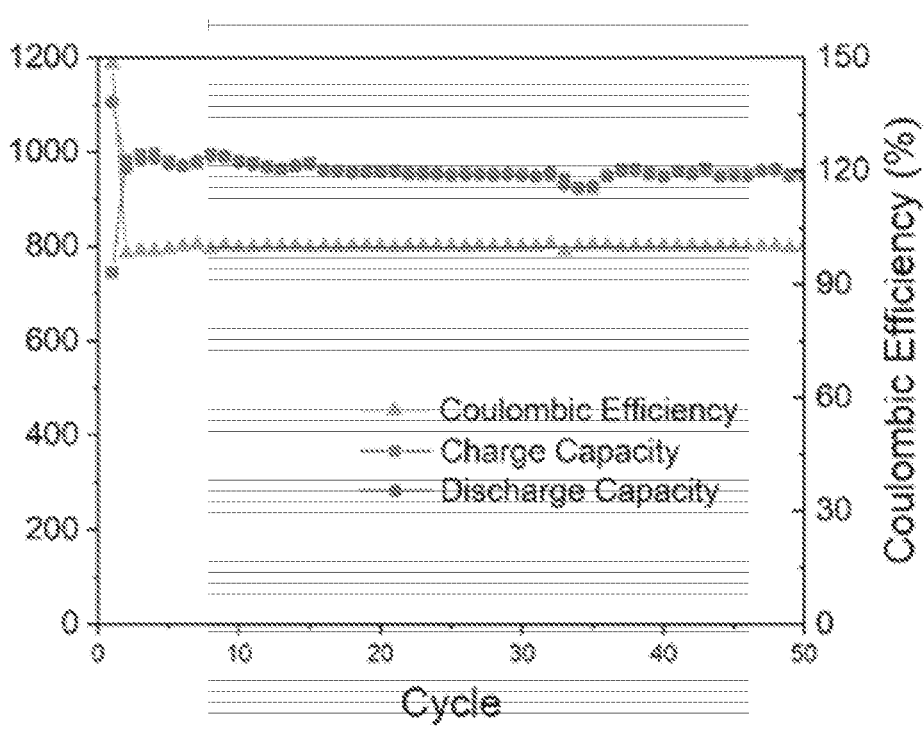

With reference to FIGS. 3A and 3B, validation tests are conducted for the present invention by using the working electrode 121 of the embodiment as mentioned in table 1 above.

The processed working electrode 121 with the additional lithium source is produced as a full battery with the following structure: LizSPAN//half cell, EC/DEC (1:1, v/v), 1M $LiPF_6$, 3 to 1 V, 0.1 C. The tests are performed under several cyclic charging. The capacity of the first cycle of charging is measured to be 730 mAh/g for the full battery including the working electrode 121 of the first embodiment in the present invention. After 50 cycles, the capacity of the 50th cycle is measured to be an even higher value of 820 mAh/g. The result indicates that the equipment provided by the present invention is capable of producing the battery having an increased capacity.

Figure 4A:
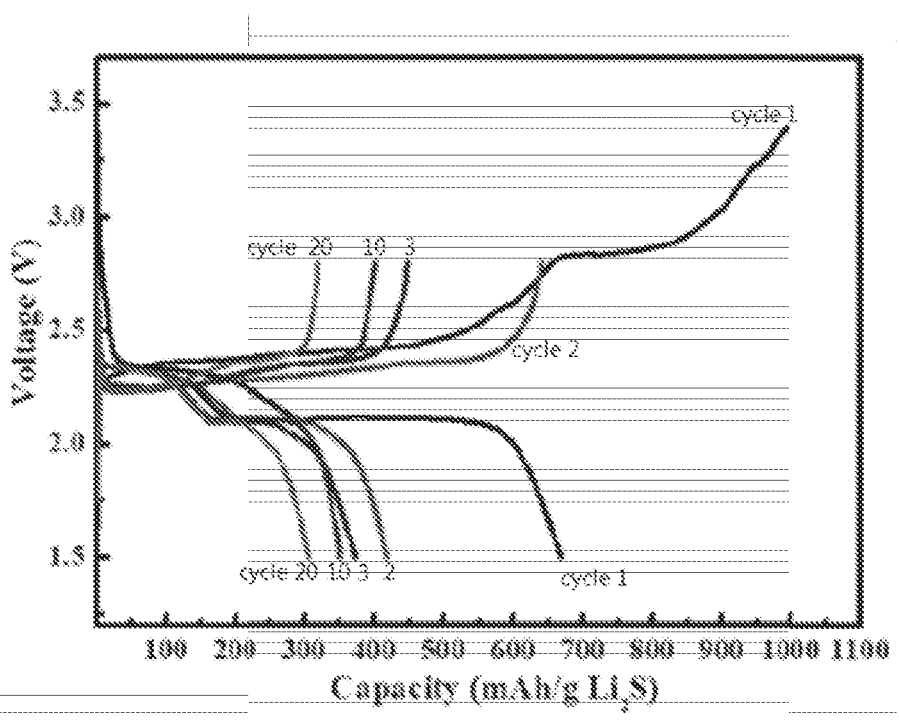
FIGS. 4A and 4B are validation tests of the comparative embodiments to show the validity of the present invention.
Figure 4B:
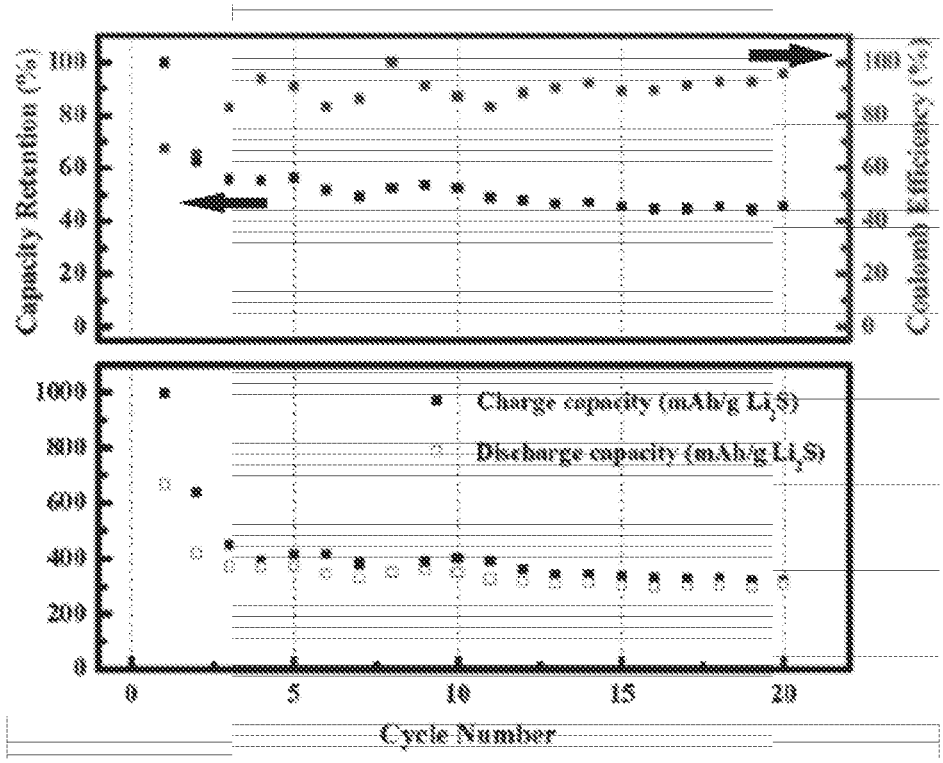

With reference FIGS. 4A and 4B, comparative tests are conducted with still a full battery with the electrode containing extra lithium source but the process with the conventional mechanically mixing method with maybe uneven disperse of the lithium source (particles). The full battery is produced with the following structure: the electrode (using mechanically mixing method)//Li half cell, DME/DOL (1:1, v/v), 1M LiTFSi, 2 wt. % $LiNO_3$, 3 to 1 V, 0.1 C. The tests are also performed under several cyclic charging. The capacity of the first cycle of charging of this comparative test is measured to be 680 mAh/g for the full battery. After only 20 cycles, the capacity of the 20th cycle is measured to be only 300 mAh/g. This full battery is also observed with many bubbles (byproduct of the electrochemical reaction inside the battery) generated and accumulated in the battery which also affects the normal operation of the battery.

The above specification, examples, and data provide a complete description of the present disclosure and use of exemplary embodiments. Although various embodiments of the present disclosure have been described above with a certain degree of particularity, or with reference to one or more individual embodiments, those with ordinary skill in the art could make numerous alterations or modifications to the disclosed embodiments without departing from the spirit or scope of this disclosure.

What is claimed is:

1. Equipment for continuously processing an electrochemical device or component for increasing capacity, the equipment comprising:
    a first reaction element comprising:
    a first reaction cell;
    a gas outlet on the first reaction cell;
    a first reaction solution contained in the first reaction cell, the first reaction solution comprising a non-metallic ion, a metallic ion selected from the group consisting of a lithium ion, magnesium ion, zinc ion, aluminum ion, or sodium ion, and a gas, wherein the gas is generated by an electrochemical reaction and discharged from the gas outlet; and
    a counter electrode immersed into the first reaction solution in the first reaction cell, a second reaction element comprising:
    a working electrode;
    a second reaction cell;
    a second reaction solution contained in the second reaction cell; and
    a separated layer between the first reaction element and the second reaction element
    wherein the first reaction element is selectively permeable with certain ions from the second reaction element through the separated layer; and wherein the metallic ion of the first reaction solution is produced within the first reaction cell, passes through the separated layer from the first reaction cell to the second reaction cell, and reduces as metal deposition to the working electrode of the second reaction cell;

wherein the first reaction solution comprises an organic medium, selected from a group consisting of polyethers or alkyl carbonates;

the second reaction solution comprises Lithium, Magnesium, Zinc, Aluminum, or Sodium compound, Ethylene carbonate or Diethyl carbonate as a reaction electrolyte; and the metal deposit comprises Lithium metal deposit, Magnesium metal deposit, Zinc metal deposit, Aluminum metal deposit, or Sodium metal deposit.

2. The equipment as claimed in claim 1, wherein a feeding inlet and an output outlet are configured to be placed at the second reaction cell; and the working electrode is continuously feeding into the feeding inlet and outputting from the output outlet.

3. The equipment as claimed in claim 2, wherein the counter electrode comprises a metal electrode; and the working electrode comprises any electrode allowing the metal deposits deposited thereon.

4. The equipment as claimed in claim 3, wherein the working electrode is any electrode material in a form of a line, a ribbon, a strip, a sheet, a column or a tube.

5. The equipment as claimed in claim 2, wherein the separated layer is selectively permeable for the metallic ion from the first reaction cell to the second reaction cell.

6. The equipment as claimed in claim 1, wherein the counter electrode comprises a metal electrode; and the working electrode comprises any electrode allowing the metal deposits deposited thereon.

7. The equipment as claimed in claim 6, wherein the working electrode is any electrode material in a form of a line, a ribbon, a strip, a sheet, a column or a tube.

8. The equipment as claimed in claim 1, wherein the separated layer is selectively permeable for the metallic ion from the first reaction cell to the second reaction cell.

9. The equipment as claimed in claim 1, wherein the metallic ion of the first reaction solution is continuously produced within the first reaction solution.

* * * * *